(12) United States Patent
Bodary et al.

(10) Patent No.: US 8,469,378 B1
(45) Date of Patent: Jun. 25, 2013

(54) STEERING KNUCKLE ASSEMBLY

(75) Inventors: Andrew Bodary, Shelby Township, MI (US); Dale Eschenburg, Rochester Hills, MI (US); Duy Lam, Baltimore, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 13/467,614

(22) Filed: May 9, 2012

(51) Int. Cl.
*B62D 7/18* (2006.01)
(52) U.S. Cl.
USPC .................................................... 280/93.512
(58) Field of Classification Search
USPC .................................................... 280/93.512
See application file for complete search history.

(56) References Cited

U.S. PATENT DOCUMENTS

| | | | | |
|---|---|---|---|---|
| 1,611,453 | A * | 12/1926 | Johnson | 280/93.512 |
| 3,940,159 | A * | 2/1976 | Pringle | 280/88 |
| 6,419,250 | B1 | 7/2002 | Pollock et al. | |
| 6,902,176 | B2 * | 6/2005 | Gottschalk | 280/93.512 |
| 6,916,030 | B2 * | 7/2005 | Cai | 280/93.512 |

* cited by examiner

*Primary Examiner* — Eric Culbreth
(74) *Attorney, Agent, or Firm* — Brooks Kushman P.C.

(57) ABSTRACT

A steering knuckle assembly having a steering knuckle and a spindle. The steering knuckle may have first and second circumferential surfaces that at least partially define a hole. The spindle may be disposed in the hole and may have first and second spindle circumferential surfaces. The first and second spindle circumferential surfaces may engage the first and second circumferential surfaces, respectively.

20 Claims, 3 Drawing Sheets

STEERING KNUCKLE ASSEMBLY

TECHNICAL FIELD

The present application relates to a steering knuckle assembly for a vehicle.

BACKGROUND

A steering knuckle assembly is disclosed in U.S. Pat. No. 6,419,250.

SUMMARY

In at least one embodiment a steering knuckle assembly is provided. The steering knuckle assembly may include a steering knuckle and a spindle. The steering knuckle may include first and second circumferential surfaces that at least partially define a hole. The spindle may be disposed in the hole and may have first and second spindle circumferential surfaces. The first and second spindle circumferential surfaces may engage the first and second circumferential surfaces, respectively.

In at least one embodiment, a steering knuckle assembly is provided. The steering knuckle assembly may include a steering knuckle and a spindle. The steering knuckle may have a hole that may be defined by a first circumferential surface, a second circumferential surface, and a step surface that extends between the first and second circumferential surfaces. The spindle may extend through the hole and may have a first spindle circumferential surface, a second spindle circumferential surface, and a spindle step surface that extends between the first and second spindle circumferential surfaces. The first and second spindle circumferential surfaces may be in continuous engagement with the first and second circumferential surfaces, respectively, and the spindle step surface may engage the step surface.

In at least one embodiment, a steering knuckle assembly is provided. The steering knuckle assembly may include a steering knuckle and a spindle. The steering knuckle may have a hole that extends along a center axis. The hole may be at least partially defined by a first circumferential surface, a second circumferential surface, and a step surface. The second circumferential surface may have a smaller diameter than the first circumferential surface. The step surface may extend from the first circumferential surface to the second circumferential surface. The spindle may extend through the hole. The spindle may have a first spindle circumferential surface, a second spindle circumferential surface, and a spindle step surface. The spindle step surface may extend substantially perpendicular with respect to the center axis and may extend from the first spindle circumferential surface to the second circumferential surface. The first and second spindle circumferential surfaces may be in continuous engagement with the first and second circumferential surfaces, respectively, and the spindle step surface may be in continuous engagement with the step surface to inhibit axial movement of the spindle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
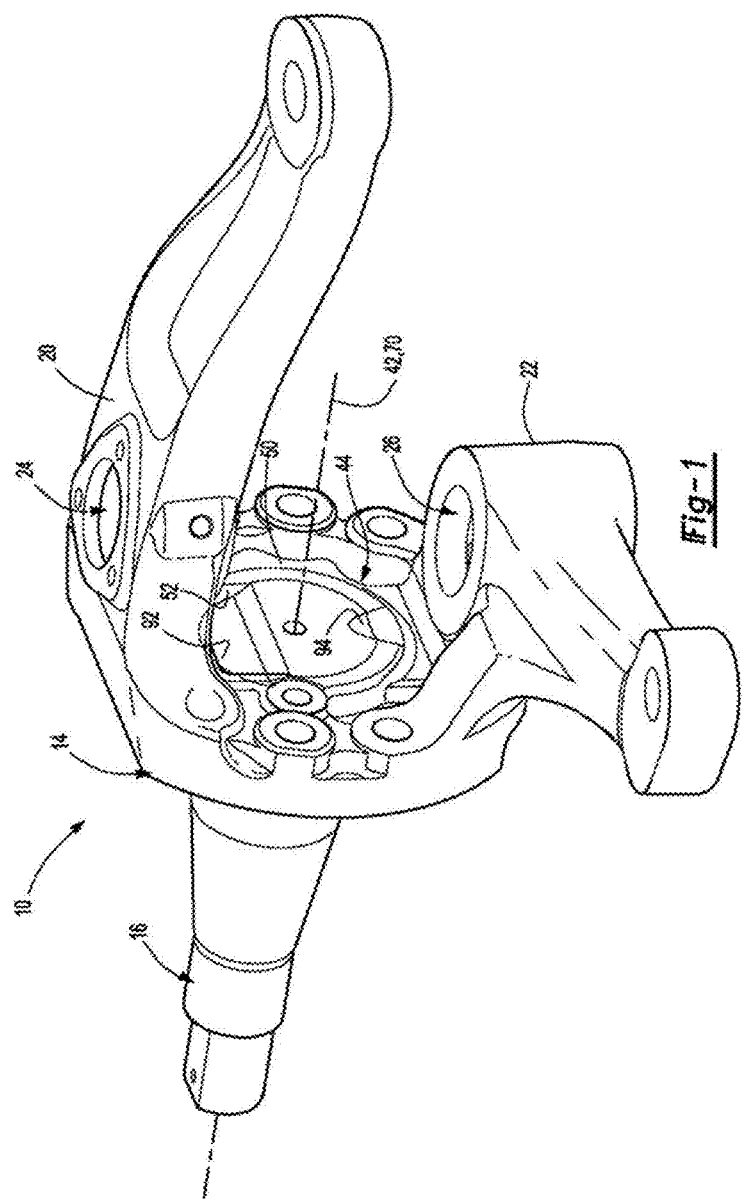
FIG. 1 is a perspective view of an exemplary steering knuckle assembly.
Figure 2:
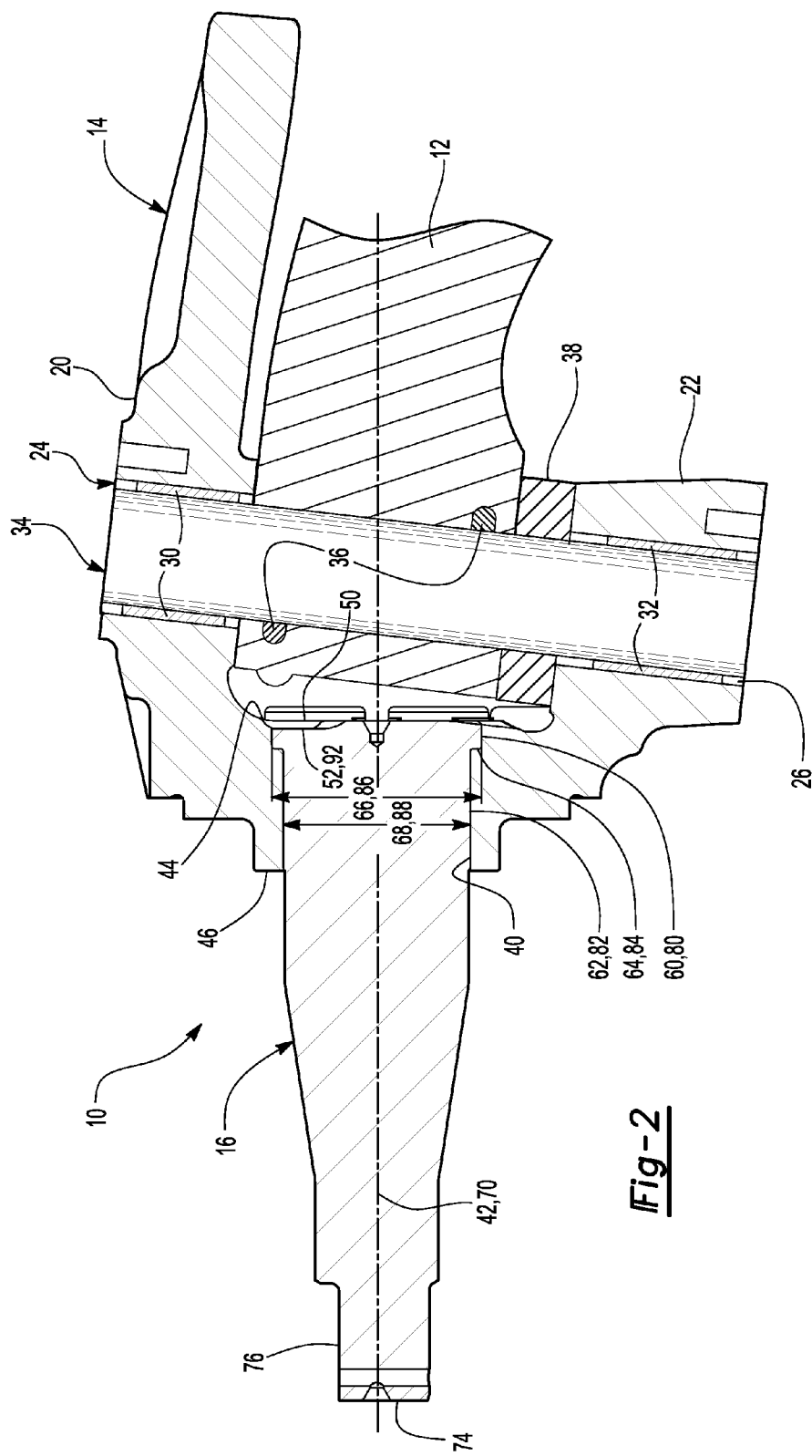
FIG. 2 is a side section view of the steering knuckle assembly coupled to an axle beam.

Referring to FIGS. 1 and 2, an exemplary steering knuckle assembly 10 is shown. The steering knuckle assembly 10 may be provided with a motor vehicle like a truck, bus, farm equipment, military transport or weaponry vehicle, or cargo loading equipment for land, air, or marine vessels. The steering knuckle assembly 10 may be coupled to an axle beam 12 and may be part of a steering system that may be used to steer or change the direction of the vehicle. In at least one embodiment, the steering knuckle assembly 10 may include a steering knuckle 14 and a spindle 16.

As is best shown in FIG. 2, the steering knuckle 14 may be coupled to the axle beam 12, which may be part of a vehicle suspension system. For example, the steering knuckle 14 may include first and second arms 20, 22 that may include first and second holes 24, 26, respectively. The first and second holes 24, 26 may be coaxially aligned and may receive first and second bushings 30, 32, respectively, and a kingpin 34.

The kingpin 34 may couple the steering knuckle 14 to the axle beam 12 such that the steering knuckle 14 may pivot about the kingpin 34. More specifically, the kingpin 34 may extend through a hole in the axle beam 12 such that opposing ends of the kingpin 34 may be received in the first and second bushings 30, 32.

One or more draw keys 36 may be provided to secure the kingpin 34 to the axle beam 12. For example, a pair of draw keys 36 may extend through openings in the axle beam 12 and may engage the kingpin 34 to fixedly position the kingpin 34 with respect to the axle beam 12.

A thrust bearing 38 may be provided between the axle beam 12 and the second arm 22 of the steering knuckle 14. The thrust bearing 38 may extend around the kingpin 34 and may facilitate pivotal movement of the steering knuckle 14.

The steering knuckle 14 may also include a hole 40 that may be disposed along a center axis 42. The hole 40 may be a through hole that may extend from a first side 44 to a second side 46 of the steering knuckle 14 that may be disposed opposite the first side 44. In addition, the hole 40 may be located between the first and second arms 20, 22.

In at least one embodiment, the first side 44 may include a rim surface 50 and a recessed surface 52. As is best shown in FIG. 1, the rim surface 50 may extend continuously around the hole 40 in a ring-like manner in one or more embodiments. In addition, at least a portion of the rim surface 50 may be disposed immediately adjacent to or at least partially define an end of the hole 40. For example, in the embodiment shown, the rim surface 50 is disposed immediately adjacent to approximately 240° of the hole 40, or from approximately a 2 o'clock position to a 10 o'clock position with respect to the center axis 42.

The recessed surface 52 may be disposed between the hole 40 and the rim surface 50. In the embodiment shown, the recessed surface 52 is disposed above the center axis 42. The recessed surface 52 may be recessed with respect to the rim surface 50, or disposed closer to the second side 46 of the steering knuckle 14 than the rim surface 50. In addition, the recessed surface 52 may be disposed substantially parallel to the rim surface 50 and may extend substantially perpendicular with respect to the center axis 42 in one or more embodiments.

As is best shown in FIG. 2, the steering knuckle 14 may include a first circumferential surface 60, a second circumferential surface 62, and a step surface 64 that may cooperate to at least partially define the hole 40.

The first circumferential surface 60 may be radially disposed about the center axis 42 and may have a first diameter 66. In at least one embodiment, the first circumferential surface 60 may extend from the first side 44 to the step surface 64. In the embodiment shown, at least a portion of the first circumferential surface 60 extends from the rim surface 50 to the step surface 64. In addition, the first circumferential surface 60 may be substantially smooth.

The second circumferential surface 62 may be radially disposed about the center axis 42 and may have a second diameter 68. The second diameter 68 may be less than the first diameter 66. As such, the first and second circumferential surfaces 60, 62 may be concentrically disposed about the center axis 42. In at least one embodiment, the second circumferential surface 62 may extend from the second side 46 to the step surface 64. In addition, the second circumferential surface 62 may be substantially smooth.

The step surface 64 may extend between the first circumferential surface 60 and the second circumferential surface 62. In at least one embodiment, the step surface 64 may extend radially or substantially perpendicular to the center axis 42 from the first circumferential surface 60 to the second circumferential surface 62.

Figure 3:
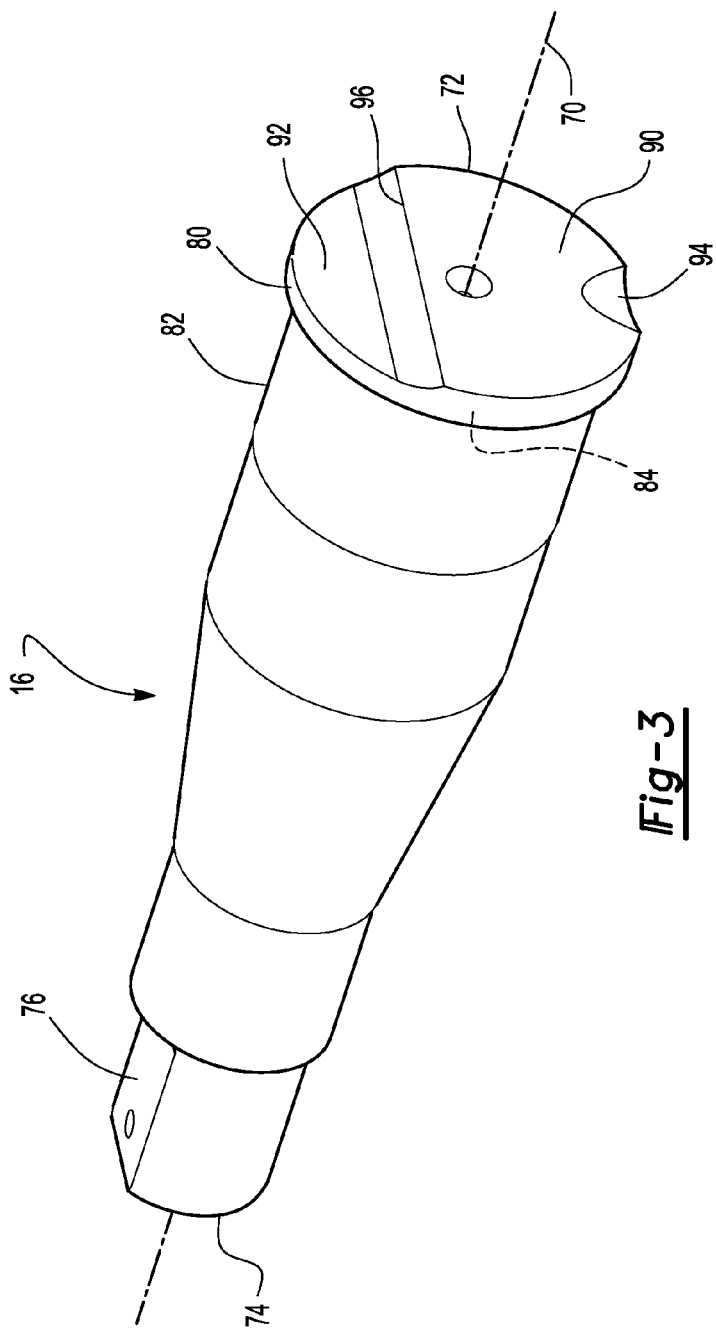
FIG. 3 is a perspective view of a spindle that may be provided with the steering knuckle assembly.

Referring to FIGS. 2 and 3, the spindle 16 may extend from the steering knuckle 14 and may support a wheel hub assembly that facilitates mounting and rotation of a vehicle wheel. More specifically, the spindle 16 may extend away from the axle beam 12 and may support one or more wheel bearings that support and facilitate rotation of a vehicle wheel. The spindle 16 may be made of any suitable material, such as a metal or metal alloy like steel. The spindle 16 may extend along a center axis 70 from a first end 72 to a second end 74 of the spindle 16. The second end 74 may be disposed opposite the first end 72 and may have a flat surface 76. The flat surface 76 may be disposed above the center axis 70 and may be disposed in a substantially horizontal plane. In addition, the spindle 16 may include a first spindle circumferential surface 80, a second spindle circumferential surface 82, and a spindle step surface 84.

The first spindle circumferential surface 80 may be radially disposed about the center axis 70 and may have a first spindle diameter 86. In at least one embodiment, the first spindle circumferential surface 80 may extend from the first end 72 to the spindle step surface 84. The first spindle circumferential surface 80 may continuously engage the first circumferential surface 60 of the steering knuckle 14 with an interference fit, thereby increasing retention force and increasing bending resistance of the spindle 16 as will be discussed in more detail below. The first spindle circumferential surface 80 may be substantially smooth in one or more embodiments. In addition, the first spindle diameter 86 of the first spindle circumferential surface 80 may act as a retention flange that helps inhibit the spindle 16 from being pulled through the hole 40 in a direction extending away from the axle beam 12 and out of the steering knuckle 14.

The second spindle circumferential surface 82 may also be radially disposed about the center axis 70 and may have a second spindle diameter 88. The second spindle diameter 88 may be less than the first spindle diameter 86. As such, the first and second spindle circumferential surfaces 80, 82 may be concentrically disposed about the center axis 70. In at least one embodiment, the second spindle circumferential surface 82 may extend from the spindle step surface 84 toward the second end 74 of the spindle 16. As such, the second spindle circumferential surface 82 may extend to or extend past the second side 46 of the steering knuckle 14. In addition, the second spindle circumferential surface 82 may be substantially smooth and may be longer than or extend a greater distance along the center axis 70 than the first spindle circumferential surface 80. The second spindle circumferential surface 82 may continuously engage the second circumferential surface 62 of the steering knuckle 14 with an interference fit, thereby increasing retention force and increasing bending resistance of the spindle 16 as will be discussed in more detail below.

The spindle step surface 84 may extend from the first spindle circumferential surface 80 to the second spindle circumferential surface 82. In at least one embodiment, the spindle step surface 84 may be extend radially or substantially perpendicular to the center axis 70. The spindle step surface 84 may be a smooth, substantially planar surface and may continuously engage the step surface 64 of the steering knuckle 14.

Referring to FIGS. 1 and 3, the first end 72 of the spindle 16 may include an end surface 90, a first indentation surface 92, and a second indentation surface 94.

The end surface 90 may be substantially planar and may extend from the center axis 70. More specifically, the center axis 70 may extend through the end surface 90 in one or more embodiments.

The first indentation surface 92 may provide clearance for the axle beam 12. The first indentation surface 92 may be recessed from the end surface 90, or disposed closer to the spindle step surface 84 than the end surface 90. The first indentation surface 92 may be offset or spaced apart from the center axis 70 in one or more embodiments. In the embodiment shown, the first indentation surface 92 intersects the end surface 90 at a chord line 96 that intersects the first spindle circumferential surface 80 at two points that are located above the center axis 70. The chord line 96 may be substantially linear and may be located in a horizontal plane. As is best shown in FIGS. 1 and 2, at least a portion of the first indentation surface 92 may be coextensive with or disposed substantially coplanar with the recessed surface 52.

The second indentation surface 94 may provide clearance for the axle beam 12. The second indentation surface 94 may be disposed below the center axis 70 and may be spaced apart from the first indentation surface 92. In the embodiment shown, the second indentation surface 94 intersects the end surface 90 along an arc.

The spindle 16 may be assembled to the steering knuckle 14 by aligning the spindle 16 with the hole 40, rotating the spindle 16 with respect to the center axis 42 to a desired angular position, inserting the spindle 16 into the hole 40, and exerting force on the spindle 16 to press fit the spindle 16 to the steering knuckle 14. As such, the first spindle circumferential surface 80 may engage the first circumferential surface 60 of the steering knuckle 14, the second spindle circumferential surface 82 may engage the second circumferential surface 62 of the steering knuckle 14, and the spindle step surface 84 may engage the step surface 64 of the steering knuckle 14 when the steering knuckle assembly 10 is assembled. Moreover, such a configuration may provide a steering knuckle assembly 10 having improved retention strength and bending resistance for its size and may facilitate the use of industry standard hub sizes.

The interference fit or engagement of the second spindle circumferential surface 82 and the second circumferential surface 62 of the steering knuckle 14 in conjunction with engagement of the first spindle circumferential surface 80 and the first circumferential surface 60 may help increase the bending resistance of the spindle 16. More specifically, engagement of the first and second spindle circumferential surfaces 80, 82 against the first and second circumferential surfaces 60, 62 may provide a longer contact distance between the spindle 16 and the steering knuckle 14 and increase the bending resistance of the spindle 16 with respect to its center axis 70 as compared to a design in which the first spindle circumferential surface 80 does not engage the steering knuckle 14. Moreover, engagement of the first spindle circumferential surface 80 and the first circumferential surface 60 may extend the contact distance between the spindle 16 and steering knuckle 14 further inward toward the axle beam 12 as compared to a design having an equivalent package space in which the first spindle circumferential surface 80 does not engage the steering knuckle 14.

The interference fit or engagement of the spindle step surface 84 and step surface 64 of the steering knuckle 14 in conjunction with engagement of the first spindle circumferential surface 80 and the first circumferential surface 60 may increase the shear resistance of the spindle 16. More specifically, engagement of the spindle step surface 84 against the step surface 64 of the steering knuckle 14 may act as a mechanical stop that inhibits axial movement of the spindle 16 through the hole 40 in a direction extending away from the axle beam 12. In addition, engagement of the first spindle circumferential surface 80 against the first circumferential surface 60 may increase the shear resistance of the retention flange area of the spindle 16, or region of the spindle 16 having the first spindle circumferential surface 80 or first spindle diameter 86, by approximately 50-60% as compared to a design having an equivalent package space in which the first spindle circumferential surface 80 does not engage the steering knuckle 14.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A steering knuckle assembly comprising:
   a steering knuckle having a first side, a second side disposed opposite the first side, a first circumferential surface that extends from the first side, and a second circumferential surface that extends from the second side toward the first side, and a step surface that extends from the first circumferential surface to the second circumferential surface, wherein the first and second circumferential surfaces at least partially define a hole; and
   a spindle that is disposed in the hole and has a first spindle circumferential surface, a second spindle circumferential surface, and a spindle step surface that extends from the first spindle circumferential surface to the second spindle circumferential surface, wherein the spindle step surface engages the step surface;
   wherein the first spindle circumferential surface engages the first circumferential surface and the second spindle circumferential surface engages the second circumferential surface.

2. The steering knuckle assembly of claim 1 wherein a diameter of the first circumferential surface is greater than a diameter of the second circumferential surface.

3. The steering knuckle assembly of claim 1 wherein a diameter of the first spindle circumferential surface is greater than a diameter of the second spindle circumferential surface.

4. The steering knuckle assembly of claim 1 wherein the spindle step surface extends substantially perpendicular to the first spindle circumferential surface.

5. The steering knuckle assembly of claim 1 wherein the spindle extends along a center axis and the spindle step surface extends radially with respect to the center axis.

6. The steering knuckle assembly of claim 1 wherein the steering knuckle includes a rim surface that extends around the hole and the spindle includes an end surface that extends from the first spindle circumferential surface, wherein the end surface is disposed substantially coplanar with the rim surface.

7. The steering knuckle assembly of claim 1 wherein the spindle step surface extends substantially perpendicular to the second spindle circumferential surface.

8. The steering knuckle assembly of claim 1 wherein the spindle includes an end that includes an end surface and a first indentation surface that extends from the end surface such that the first indentation surface is disposed closer to the second spindle circumferential surface than the end surface.

9. The steering knuckle assembly of claim 8 wherein the spindle extends along a center axis and wherein the first indentation surface is completely disposed above the center axis.

10. The steering knuckle assembly of claim 9 wherein the end surface and the first indentation surface meet at a chord line that intersects the first spindle circumferential surface at two points that are located above the center axis.

11. The steering knuckle assembly of claim 9 wherein the steering knuckle further comprises a rim surface that extends around the hole and a recessed surface disposed between the rim surface and the hole, wherein the end surface is substantially coplanar with the rim surface and at least a portion of the recessed surface is disposed substantially coplanar with the first indentation surface.

12. The steering knuckle assembly of claim 11 wherein the recessed surface extends from the first spindle circumferential surface and is disposed closer to the spindle step surface than the end surface.

13. The steering knuckle assembly of claim 9 further comprising a second indentation surface disposed below the center axis that is spaced apart from the first indentation surface.

14. The steering knuckle assembly of claim 9 wherein the first spindle circumferential surface has a larger diameter than the second spindle circumferential surface and the first and second spindle circumferential surfaces cooperate to inhibit axial movement of the spindle with respect to the steering knuckle.

15. A steering knuckle assembly comprising:
   a steering knuckle having a hole that extends along a center axis and that is at least partially defined by a first circumferential surface that extends from a first side of the steering knuckle, a second circumferential surface that extends from a second side of the steering knuckle and that has a smaller diameter than the first circumferential surface, and a step surface that extends from the first circumferential surface to the second circumferential surface; and
   a spindle that extends through the hole, the spindle including:
      a first spindle circumferential surface, a second spindle circumferential surface, and a spindle step surface that extends substantially perpendicular with respect to the center axis from the first spindle circumferential surface to the second circumferential surface;

wherein the first spindle circumferential surface is in continuous engagement with the first circumferential surface, the second spindle circumferential surface is in continuous engagement with the second circumferential surface, and the spindle step surface is in continuous engagement with the step surface and cooperate to inhibit axial movement of the spindle when the spindle is inserted into the hole in a direction that extends from the first side toward the second side of the steering knuckle.

16. The steering knuckle assembly of claim 15 wherein the first and second spindle circumferential surfaces are concentrically disposed with respect to the center axis.

17. The steering knuckle assembly of claim 15 further comprising an axle beam that is mounted to the steering knuckle.

18. The steering knuckle assembly of claim 17 wherein the spindle includes an end surface that extends radially from the center axis and a first indentation surface that is disposed closer to the spindle step surface than the end surface to provide clearance between the first indentation surface and the axle beam.

19. The steering knuckle assembly of claim 18 wherein the steering knuckle further comprises a rim surface that extends around the hole and wherein the end surface is aligned with the rim surface.

20. The steering knuckle assembly of claim 19 wherein a portion of the rim surface extends from the first circumferential surface.

* * * * *